United States Patent [19]

Koizumi et al.

[11] Patent Number: 5,474,249
[45] Date of Patent: Dec. 12, 1995

[54] METHOD FOR PRODUCING TAPE LEADERS FOR HUBS

[75] Inventors: Osamu Koizumi; Takayasu Hirano, both of Miyagi, Japan

[73] Assignee: Sony Corporation, Tokyo, Japan

[21] Appl. No.: 412,530

[22] Filed: Mar. 29, 1995

Related U.S. Application Data

[62] Division of Ser. No. 118,238, Sep. 9, 1993.

[30] Foreign Application Priority Data

Sep. 14, 1992 [JP] Japan ................................. 4-269063
May 19, 1993 [JP] Japan ................................. 5-116688

[51] Int. Cl.⁶ .......................... B65H 35/08; G11B 23/087
[52] U.S. Cl. .......................... 242/526; 242/344; 242/532.5; 242/534; 360/132
[58] Field of Search .......................... 242/532.5, 333.2, 242/344, 357, 526, 586.2, 534; 360/132, 134, 74.6

[56] References Cited

U.S. PATENT DOCUMENTS

| | | | |
|---|---|---|---|
| 3,677,505 | 7/1972 | Van Taylor | 242/532.5 X |
| 3,706,844 | 12/1972 | Besier et al. | 242/333.2 X |
| 3,826,447 | 7/1974 | Uabu et al. | 242/333.2 X |
| 4,135,316 | 1/1979 | Saito | 242/344 X |
| 4,247,977 | 2/1981 | Nakamura | 242/586.2 X |
| 4,989,111 | 1/1991 | Sato | 242/344 |
| 5,239,437 | 8/1993 | Hoge et al. | 360/134 X |

*Primary Examiner*—John Q. Nguyen
*Attorney, Agent, or Firm*—William S. Frommer; Alvin Sinderbrand

[57] ABSTRACT

A tape cassette is provided which has indicia indicating the characteristics of the tape contained therein. In one embodiment an information discriminating mark, capable of being optically sensed is provided on the magnetic tape. Fluctuations in the transmittance of the tape are detected by a photodetector device and a difference in the detected output is utilized for identifying the type of the tape cassette. In another embodiment, the bottom surface of the tape cassette is provided with physical indicia indicating the characteristics of the tape contained therein.

3 Claims, 10 Drawing Sheets

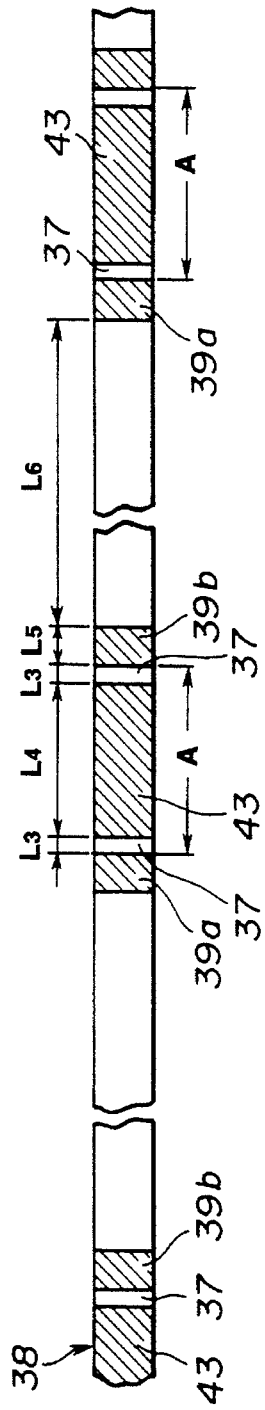
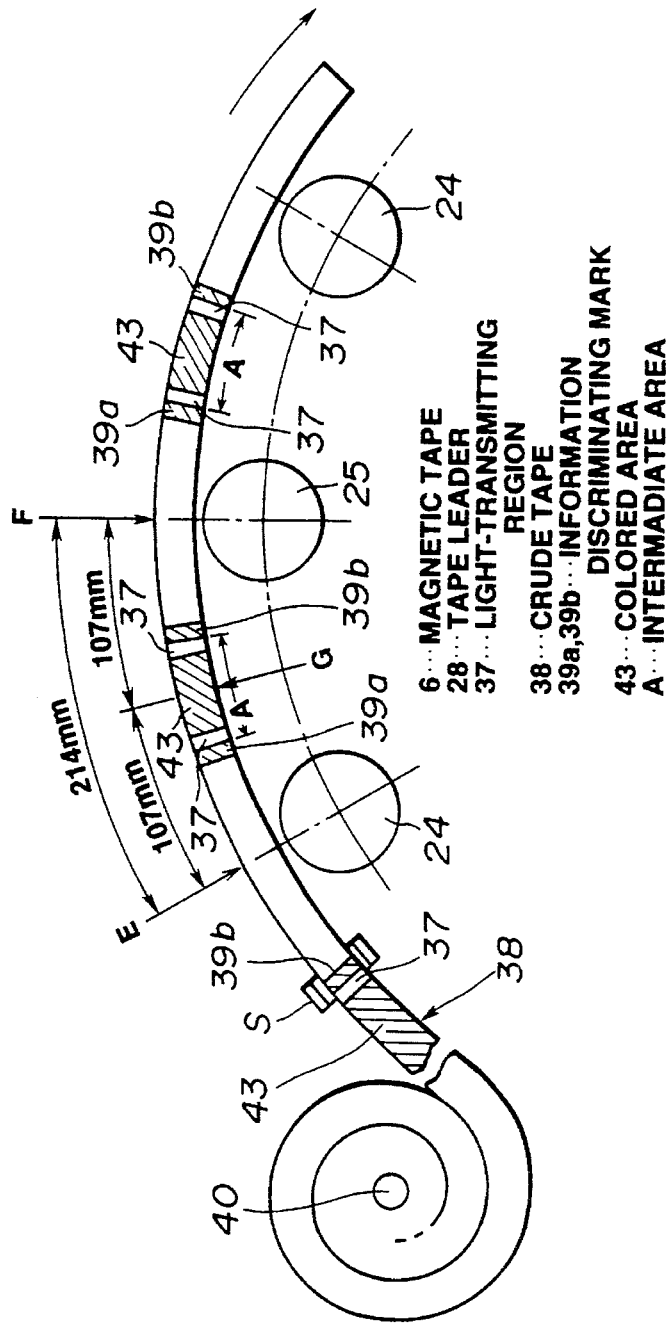

METHOD FOR PRODUCING TAPE LEADERS FOR HUBS

This application is a division of application Ser. No. 08/118,238, filed Sep. 9, 1993.

BACKGROUND OF THE INVENTION

This invention relates to a tape cassette comprising a magnetic tape coiled around a pair of tape reels rotatably mounted within a pair of cassette halves making up a cassette main body. More particularly, it relates to such tape cassette so designed and arranged that a discrimination may be made as to whether the tape cassette loaded on a recording/reproducing apparatus is used exclusively for recording video signals or used for recording data signals.

In general, a detection method employing optical means is adopted for detecting a leading end or a trailing end of an elongated magnetic tape contained within the cassette halves making up the tape cassette.

For implementing the detection method employing such optical means, the cassette halves containing the magnetic tape therein is formed with openings facing light emitting devices arranged on the recording/reproducing apparatus. These openings are formed so as to be positioned intermediate between a pair of tape reels rotatably mounted within the cassette halves. On the other hand, the opposite lateral sides of the cassette halves are formed with light-transmitting apertures through which the light from the light emitting devices facing the inside of the cassette halves via the above openings may be transmitted to outside of the cassette halves via the interposed magnetic tape. The recording/reproducing apparatus is provided with light-receiving devices (photodetector devices) for detecting the light transmitted through the light-transmitting apertures formed in the cassette halves. The state of light transmitted through the light-transmitting apertures is detected by these light receiving devices for detecting the leading and trailing ends of the magnetic tape. That is, the leading and trailing ends of the magnetic tape, contained within the cassette halves, are connected to tape leaders having a sufficiently proven mechanical strength. It is by these tape leaders that the magnetic tape is attached to the tape reels. The magnetic tape coated with a magnetic recording medium has a light transmittance different from that of the tape leader not coated with a magnetic recording medium. Specifically, the light transmittance of the magnetic tape to the light of a wavelength of 800 to 900 nm is not higher than 60%, while that of the tape leader to the same light is not less than 60%. With the detection method employing optical means, the leading and trailing ends of the magnetic tape are discriminated from each other based on the difference in light transmittance between the magnetic tape and the tape leader.

In the method for detecting the leading and trailing ends of the magnetic tape employing the above-mentioned light-emitting and light-receiving devices, the light from the light-emitting device facing the inside of the cassette halves is received by each light receiving device. The amount of light received by the light-receiving device mounted on the tape supplying tape reel is compared to that received by the light-receiving device mounted on;the tape take-up tape reel. If a detection output by the light-receiving device mounted on the tape supplying tape reel is larger than that by the light-receiving device mounted on the tape take-up tape reel, the tape end is decided to be the leading end. If otherwise, the tape end is decided to be the trailing end. In other words, the tape end is found to be the leading end or the trailing end depending on which of the light-receiving devices has detected the high light transmittance tape leader connected to the leading or trailing end of the magnetic tape. Meanwhile, if detection outputs by the light-receiving devices are equal, a decision is given that the magnetic tape is in a running state.

It should be noted that the tape cassette containing a magnetic tape having a tape width of 8 mm is classed into the tape cassette exclusively employed for recording of picture signals and the tape cassette exclusively employed for recording of data signals, with the cassette halves being used in common with these two tape cassette types. These two types of the tape cassettes are extremely difficult to discern from each other as long as the appearance of the tape cassette is concerned. Besides, the magnetic tape contained in the tape cassette dedicated to the recording of picture signals is different in type from the magnetic tape contained in the tape cassette dedicated to the recording of picture signals. Consequently, should the tape cassette for picture signals be used for recording .the tiara signals, it may occur that the recording capacity falls short such that required data can not be recorded. Besides, the magnetic tape for picture signals has an error rate security different from that of the magnetic tape for data signals, so that dropout of recording data signals tends to be incurred if the tape cassette for picture signals be used for recording data signals.

OBJECTS AND SUMMARY OF THE INVENTION

It is an object of the present invention to provide a tape cassette adapted for containing different types of magnetic tapes despite the same cassette half shape, wherein the tape cassettes containing different magnetic tape types may be discerned from each other.

It is another object of the present invention to provide a tape cassette which renders it possible to discern tape cassette types instantly and reliably despite its simplified construction.

In accordance with the present invention, there is provided a tape cassette including a cassette main body having a first opening for receiving the light from a light emitting device provided on tape driving means, and a second opening facing a light-receiving device provided on the tape driving means, the light-receiving element receiving the light transmitted from the light-emitting device through the cassette main body, a first tape reel and a second tape reel mounted in said cassette about a first axis and about a second axis, respectively, and a tape attached at one end to said the tape reel and at the other end to the second tape reel, characterized in that an information discriminating mark is provided on the magnetic tape at a position closer to the center of the tape than a point of intersection of the tape with a line interconnecting the first and second openings with the tape being fully wound on one of the first and second tape reels.

The above and other objects will become more apparent from the following description of the preferred embodiments and the claims.

BRIEF DESCRIPTION OF THE DRAWINGS

FIG. 8A is a front view showing a modified crude tape from which the tape leader employed in a tape cassette according to the present invention is produced.

FIG. 8B is a schematic view showing an apparatus for producing a tape leader from the crude tape shown in FIG. 8A.

DESCRIPTION OF THE PREFERRED EMBODIMENTS

Figure 1:
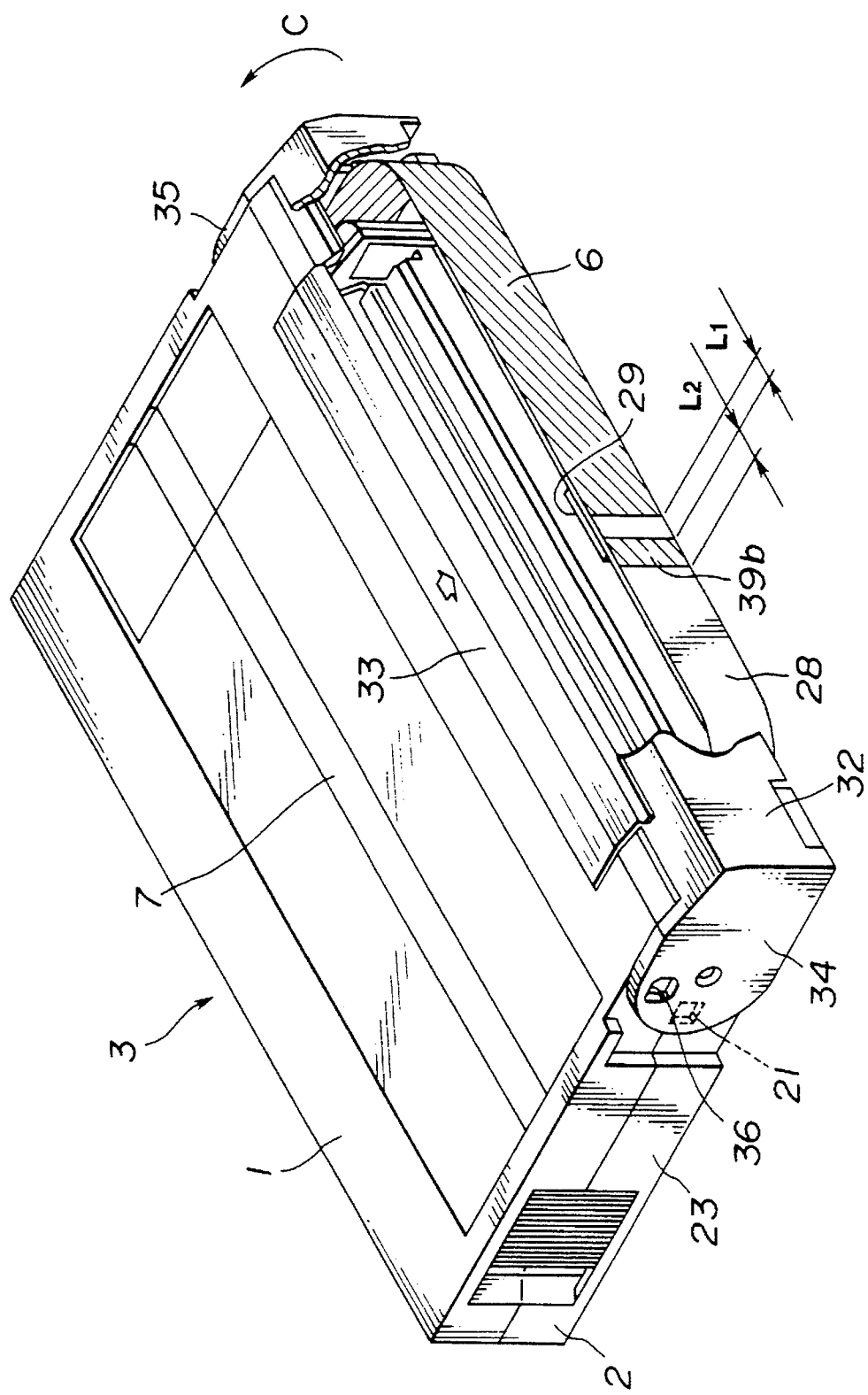
FIG. 1 is a perspective view showing a tape cassette according to the present invention.

By referring to the drawings, preferred embodiments of the present invention will be explained in detail.

Figure 2:
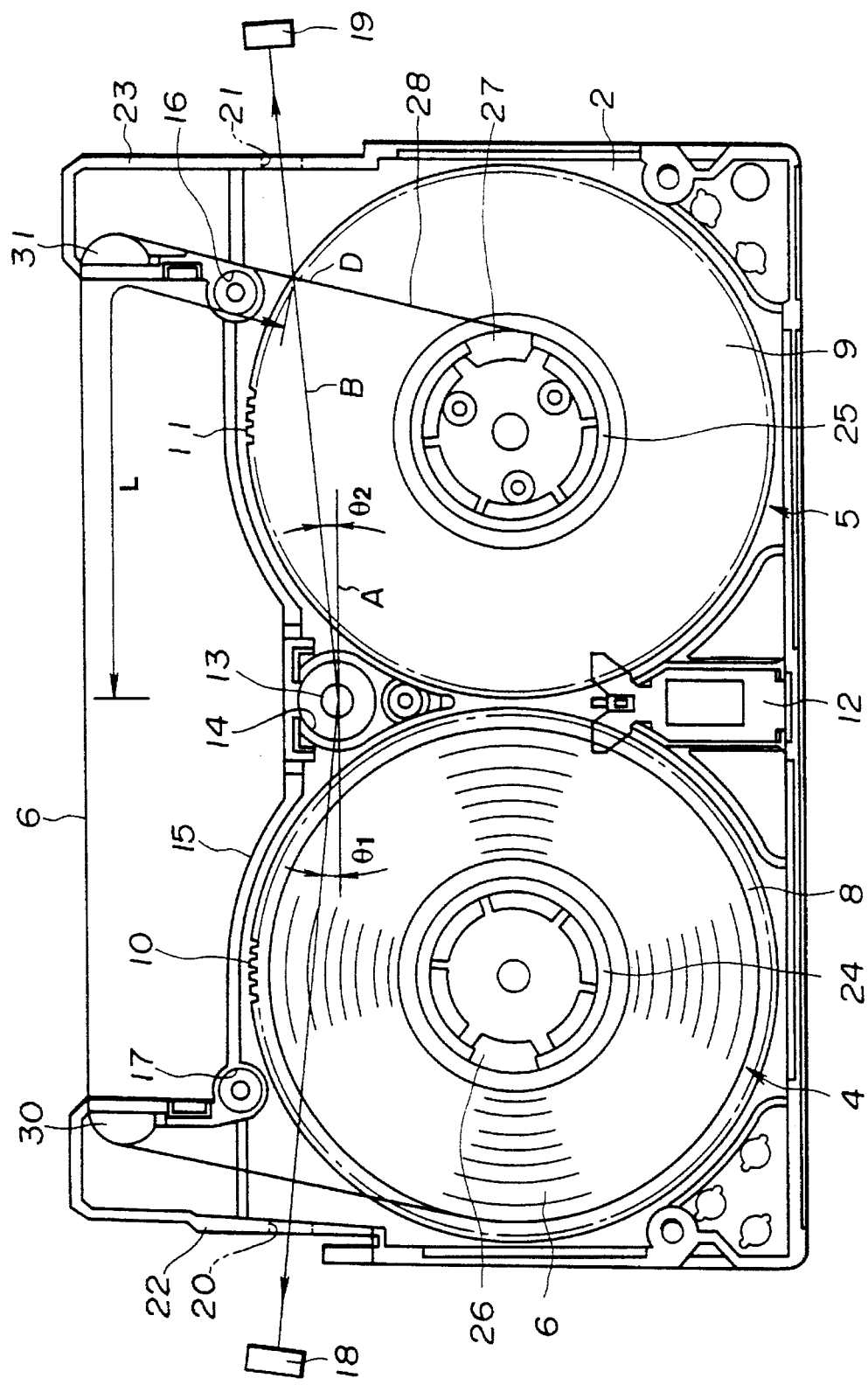
FIG. 2 is a plan view showing a cassette main body from which an upper cassette half is removed.

A tape cassette shown in FIGS. 1 and 2 includes cassette main body 3, made up of an upper half 1 and a lower half 2, a pair of tape reels 4, 5 rotatably contained within the cassette main body 3 and a magnetic tape 6 coiled around these tape reels 4, 5.

The upper half 1 and the lower half 2, making up the cassette main body 3, are each molded integrally, such as by injection molding, to a size large enough to accommodate rotatably a pair of tape reels 4, 5 each wound with magnetic tape 6. The upper and lower halves 1, 2 are abutted to each other at the opened sides to complete the cassette main body 3.

The upper half 1 is formed on its upper surface with a transparent window 7 which permits the winding of the magnetic tape 6 housed within the cassette main body 3 to be checked visually from outside. The lower half 2 is provided with a reel locking member 12 meshing with gears 10, 11 formed on the outer periphery of flanges 8, 9 formed on tape reels 4, 5, respectively, for inhibiting rotation of these tape reels 4, 5.

The lower half 2 is also formed with a hole 14 for accommodating a light emitting device 13 provided on the recording/reproducing apparatus as photodetection means for facing the inside of the lower half 3. The hole 14 for accommodating the light emitting device is formed as a circular opening in register with the light emitting device 13 provided on the recording/reproducing apparatus. In the present embodiment, the hole 14 is located at a mid part between the tape reels 4, 5 and is offset towards a tape extracting recess 15 formed on the front surface of the cassette half 3 into which a tape extracting pin of the recording/reproducing apparatus is introduced.

The lower half 2 is also provided with cassette positioning holes 16, 17 into which cassette positioning pins of the recording/reproducing apparatus are introduced for positioning the tape cassette in position within the recording/reproducing apparatus. These cassette positioning holes 16, 17 are formed as circular and elliptical openings at both opening edges towards the tape extracting recess 15 of the cassette main body 3.

The lower half 2 is also formed with light-transmitting through-holes 20, 21 defining a light path for receiving the detection light from the light emitting device 13 by a pair of light-receiving devices 18, 19 provided on the recording/reproducing apparatus. These through-holes 20, 21 are formed as square-shaped holes, with each side 2.5 mm long, on lateral sides 22, 23 facing the light-receiving devices 18, 19. In the embodiment illustrated, the light-transmitting through-holes 20, 21 are formed at such positions that a line A passing through the center of the light-emitting device 13 and extending parallel to the magnetic tape 6 drawn out along a straight path within the recess 15 makes angles $\Theta 1$, $\Theta 2$ of 5.5° with respect to a line B interconnecting the light-emitting device 13 and light-receiving devices 18, 19.

These tape reels 4, 5 are provided with cylindrical hubs 24, 25, around which the magnetic tape 6 is coiled, and disc-shaped flanges 8, 9 provided on only one side of these hubs 24, 25. These tape reels 4, 5 are pivotally mounted by having one end of hubs 24, 25 provided with the flanges 8, 9 facing circular attachment holes, not shown, formed on the bottom surface of the lower half 2. These tape reels 4, 5 are prevented from fluttering by having the mid region of the hubs 24, 25 thrust in an axial direction by reel retention springs, not shown, provided on the upper half 1.

Figure 3:
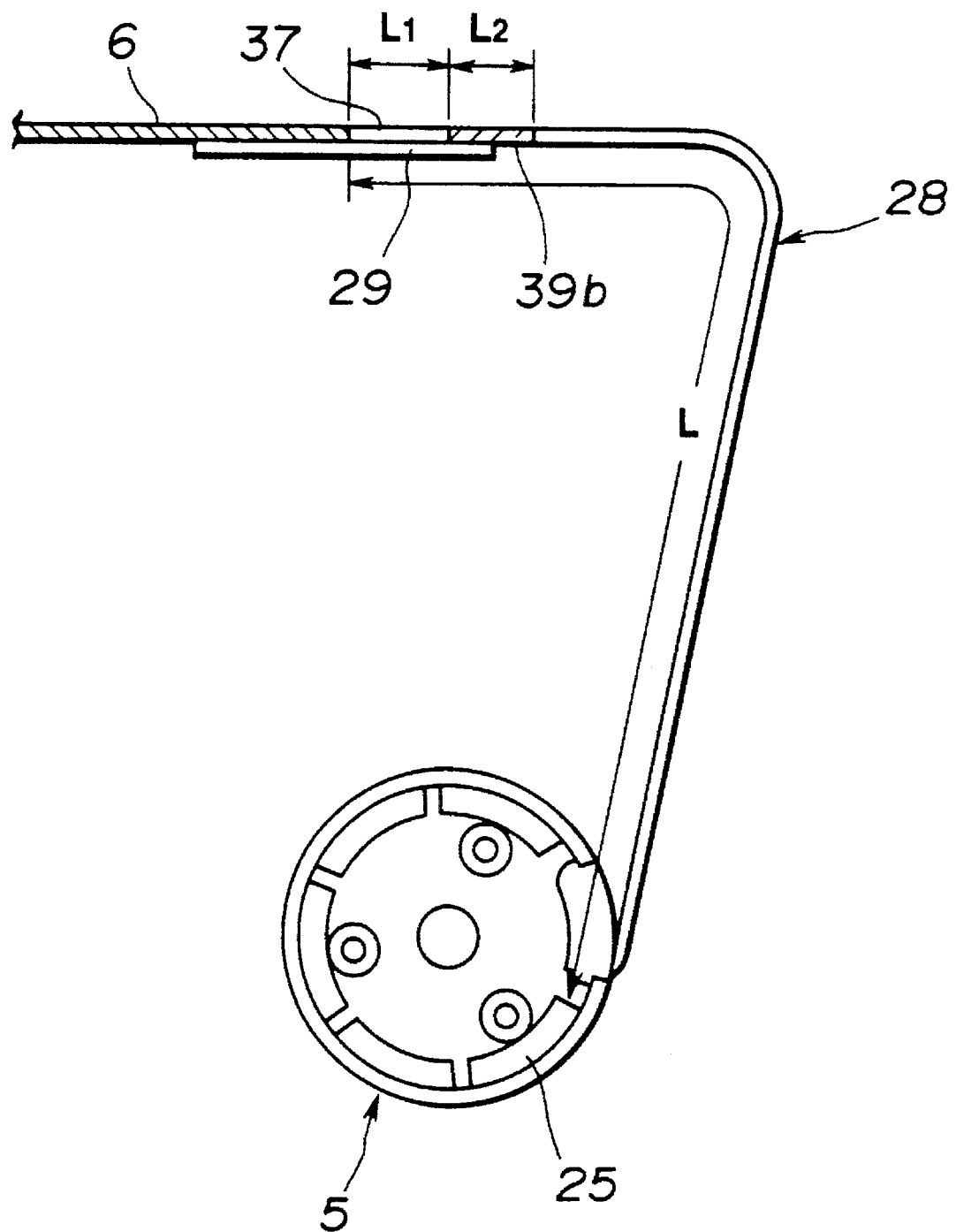
FIG. 3 is an enlarged plan view showing the state of connection of both ends of a tape leader connected to a magnetic tape.

The magnetic tape 8 is connected to an end of a transparent tape leader 28 having its other end secured by clampers 26, 27. The tape leader at the supply side is not shown. The magnetic tape 8 is connected to the tape leader 28 by a thin transparent connection tape 29 having an adhesive layer on one of its surfaces. The connection tape 29 is known as splice tape. The magnetic tape 6 and the tape leader 28 are placed in a butt-to-butt relation and connected to each other by the connection tape 29 which is placed for bridging the tape 6 and the tape leader 28 in contact with the back surfaces of the tape 6 and the tape leader 28 opposite to the recording surface 3 contacted by the magnetic head as shown in FIG. 3. The connecting tape 29 is formed of the same material as the tape leader 28.

The magnetic tape 6 is wound a predetermined length on the supply side tape reel 4 and guided along semi-arcuate tape guides 30, 31 provided on the edge of an opening of the tape extracting recess 15 of the cassette main body 3 so as to be guided linearly within the recess 15.

The magnetic tape 6, adapted to travel within the extracting recess 15, is covered by a front lid 32 and a back lid 33 functioning as an opening/closure cover for protecting the magnetic tape 6 against foreign matter or external pressure or force when the tape cassette is not loaded in position on the recording/reproducing apparatus. When the tape cassette is not loaded in position on the recording/reproducing apparatus, the front lid 32 and the back lid 33 cover the recess 15 for holding the tape 6 in-between. When the tape cassette is loaded in position on the recording/reproducing apparatus, the front lid 32 and the back lid 33 are pivoted as shown by an arrow C in FIG. 1 for exposing the magnetic tape 6 within the recess 15.

Meanwhile, a pair of supports 34, 35 for pivotally supporting the front lid 32 with respect to the cassette main body 3 are formed with rectangular-shaped through-holes 36 only one being shown, for exposing the through holes 20, 21 in the lower half 2 to the outside. The through-holes 36 are formed at such positions as to be in register with the light-transmitting through-holes 20, 21 on opening the front lid 32, and are dimensioned at least to be larger than the light-transmitting through-holes 20, 21.

In the embodiment illustrated, for discriminating the cassette for data dedicated to recording of data signals from the cassette for video dedicated to the recording of video signals, information discriminating marks 39a, 39b, which may be detected by optical means, are provided on the tape leader 28 only for the tape cassette containing the magnetic tape 6 for data. For such discrimination, photodetector means made up of a light emitting device 13 and light-receiving devices 18, 19, for detecting the leading and trailing ends of the magnetic tape 6, is employed, and the corresponding information is detected by output fluctuations in an output of the photodetector means. That is, the information discriminating marks 39a, 39b are formed of a material having light transmittance substantially equal to that of the magnetic tape 6, and are provided on the transparent tape leader 28 having light transmittance higher than that of the magnetic tape 6. If the output fluctuations are incurred as a result of difference in light transmittance between the magnetic tape 6 and the information discriminating marks 39a, 39b on one hand and light-transmitting regions 37 defined between the magnetic tape 6 and the information discriminating marks 39a, 39b on the other hand, the tape is decided to be the tape for data. That is, the output remains constant for the magnetic tape 6 and the information discriminating marks 39a, 39b, whereas a larger output is produced for light-transmitting regions 37 between the discriminating marks 39a, 39b. In such case, the tape is decided to be the tape for data.

Specifically, the information discriminating marks 39a, 39b are formed of a material which will transmit the light having a wavelength of 800 to 900 nm at a transmittance of not higher than 60% in the same manner as for magnetic tape 6. The materials which will meet these requirements may include, but are not limited to a magnetic material, such as Co—Ni magnetic material constituting the magnetic layer for the magnetic tape 6, carbon black or the Metal materials, such as aluminum. The information discriminating marks 39a, 39b may be produced by silk printing or pad printing, employed in general as printing techniques, or by a method consisting in coating a UV curable resin. They may also be produced by vacuum thin-film forming technique, such as evaporation or sputtering.

It is necessary for a length $L_2$ of the information discriminating marks 39a, 39b to be at least 3 mm for completely stopping the light-transmitting through-holes 20, 21. The reason the length $L_2$ is selected to this value is that, since the light-transmitting through-holes 20, 21 are square-shaped with each side 2.5 mm long, these through-holes may be stopped completely with the length $L_2$ 2.5 mm or longer, however, since the portion of the tape leader 28 between the take-up side tape reel 5 and the tape guide member 31 is positioned obliquely when the magnetic tape 6 is taken up in its entirety on the supply side tape reel 4, as shown in FIG. 2, it is necessary to set the length $L_2$ to a larger value to take account of the increased length.

Figure 4:
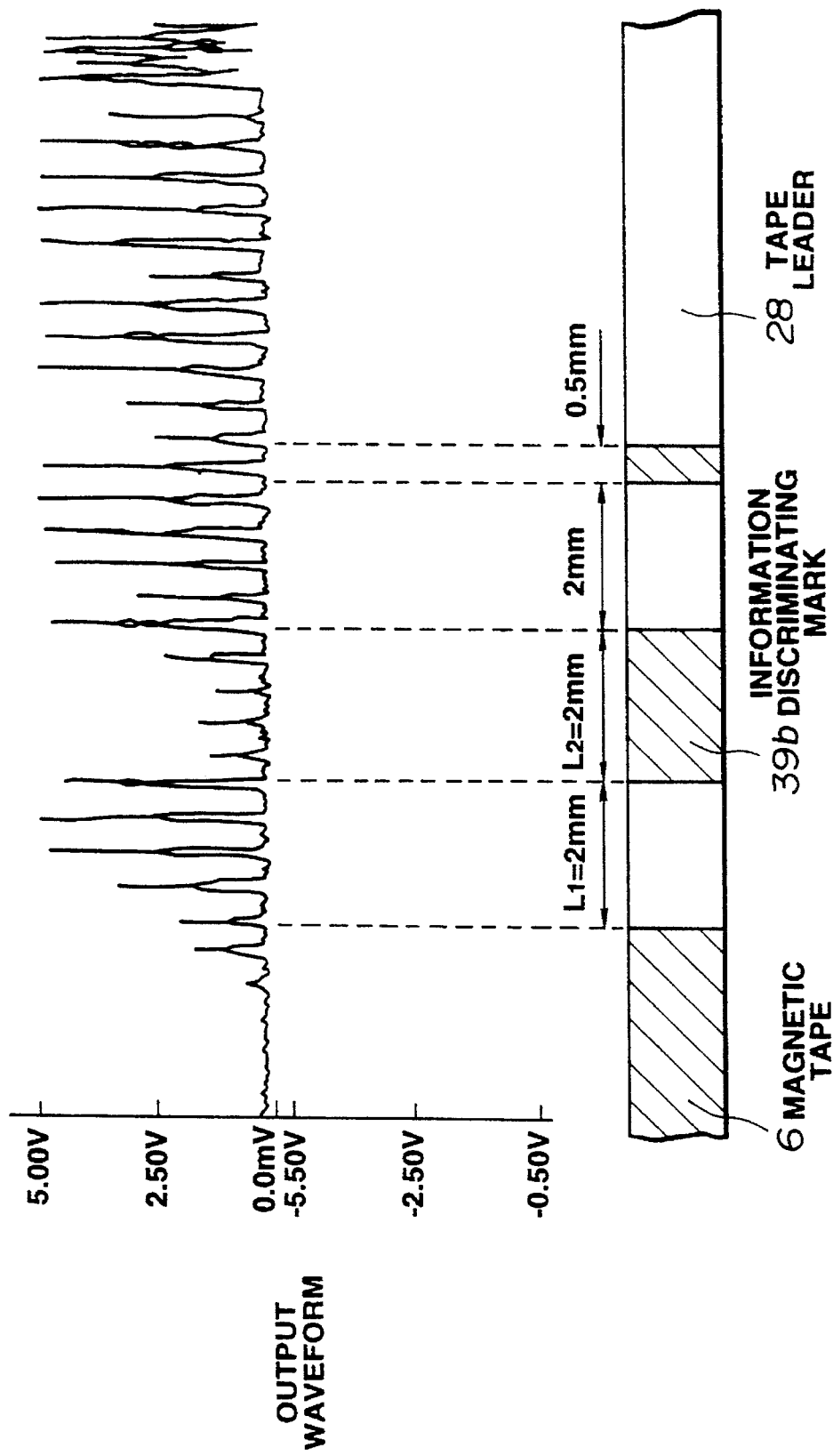
FIG. 4 is an output waveform diagram for a light-emitting device for an information discriminating mark of 2 mm.
Figure 5:
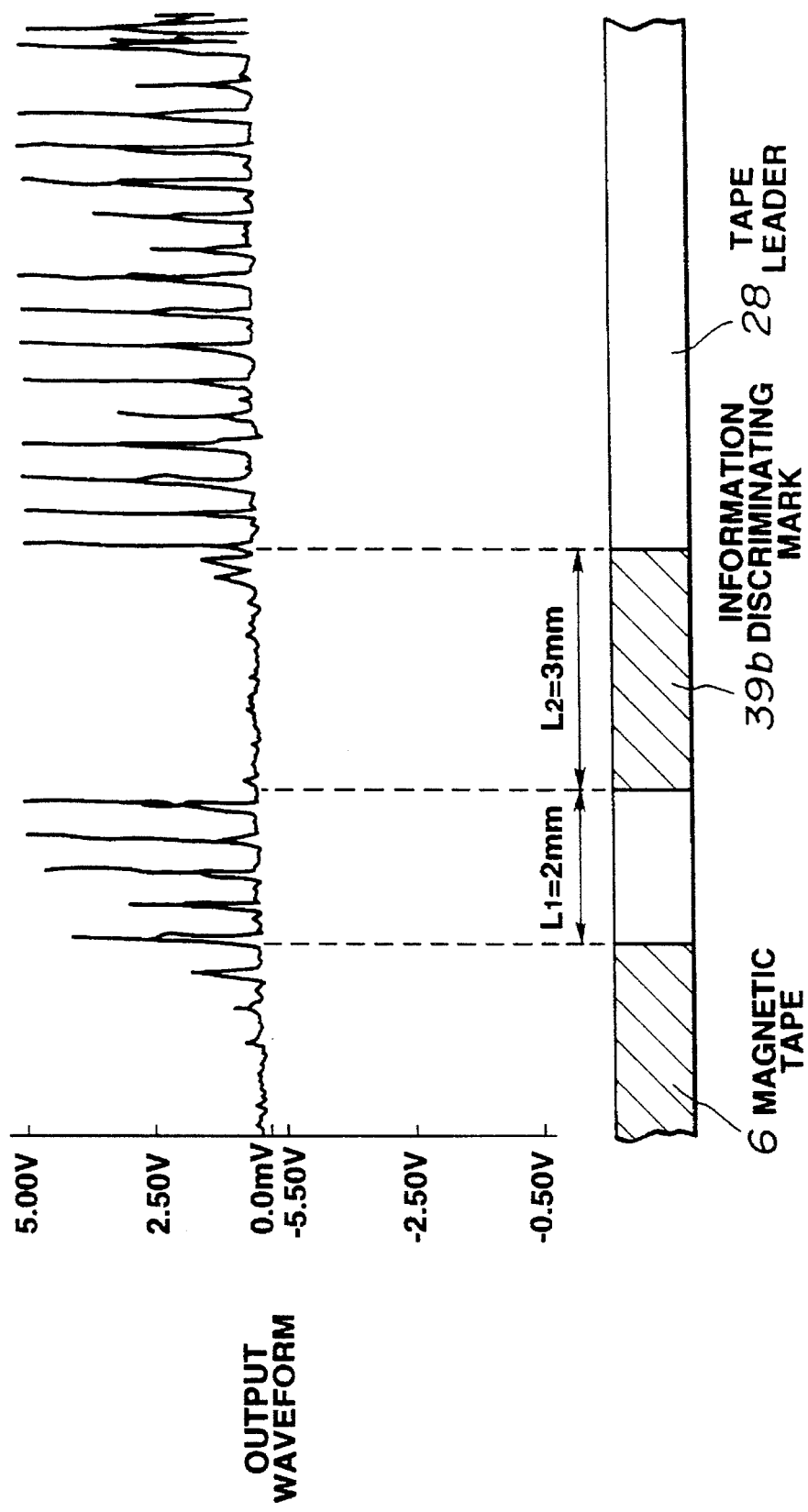
FIG. 5 is an output waveform diagram for a light-emitting device for an information discriminating mark of 3 mm.

FIGS. 4 and 5 illustrate output waveforms produced at the light-receiving devices 18, 19 for the length $L_2$ of the information discriminating marks 39a, 39b of 2 mm and 3 mm, respectively. It is seen from these figures that, although the output voltage should be 0 mV if the light-transmitting through-holes 20, 21 are stopped completely because the information discriminating marks 39a, 39b are of light transmittance of not higher than 60%, an output voltage on the order of 1.3 mV is produced for the length $L_2$ of 2 mm of the information discriminating marks 39a, 39b, meaning that the light-transmitting through-holes 20, 21 are not stopped completely. These through-holes 21, 22 may be stopped completely if the information discriminating marks 39a, 39b are set to 3 mm or longer.

The light-transmitting region 37 having a length $L_1$ needs to be provided between each of the information discriminating marks 39a, 39b and the end of the magnetic tape 6 connected to the tape leader 28. Since the light transmittance of the tape leader 28 is 60% or higher, a 100% output based on an output at the magnetic tape 6 and the information discriminating marks 39a, 39b of 0% is produced if the length $L_1$ is 3 mm of completely opening the light-transmitting through-holes 20, 21. However, since the leading and trailing ends of the magnetic tape 6 may be discerned from each other if the output is not less than 60%, so that the length $L_1$ becomes equal to 3×0.6=1.8 mm. Thus the length $L_1$ is set to 2 mm to take account of safety allowance. Meanwhile, as for the $L_1$ region, the connecting tape 29 is formed of a material which will transmit the light having the wavelength of 800 to 900 nm, similarly to the tape leader 28, even although the connecting tape 29 is bonded to the back side of the tape leader 28, so that the output of 60% or higher is assured at the light-receiving devices 18, 19.

Besides, it cannot be said that the information discriminating marks 39a, 39b may be provided at any position which is not less than 2 mm from the end of the magnetic tape 6. That is, the information discriminating marks 39a, 39b need to be formed at the positions closer to the magnetic tape 6 than a point of intersection D of the line B shown in FIG. 2 with the tape leader 28 between the tape reel 5 and the tape guide member 28. That is, if the information discriminating marks 39a, 39b are positioned so as to be closer to the tape reel 5 than the point of intersection D, the information discriminating marks 39a, 39b are taken up on tape reel 5 before being detected by the light-receiving devices 18, 19 when the tape cassette is loaded on the recording/reproducing apparatus for recording and/or reproduction in the state in which the tape is fully on the tape reel 4 as shown in FIG. 2.

The take-up side tape leader 28 has an overall length L of 90 mm and has its one end connected to the hub 25 of the take-up side tape reel 5 while having its other end connected to the magnetic tape 6 via the connection tape 29, as shown in FIG. 3. The information discriminating mark 39b is provided on the other side of the tape leader via the light-transmitting region 37. The light-transmitting region 37 and the information discriminating mark 39b are of width $L_1$ of 30 mm and a width $L_2$ of 5 mm, respectively.

The supply side tape leader 28 is symmetrical with respect to the take-up side tape leader 28. These tape leaders 28, are produced from the crude tape in the following manner.

Figure 6:
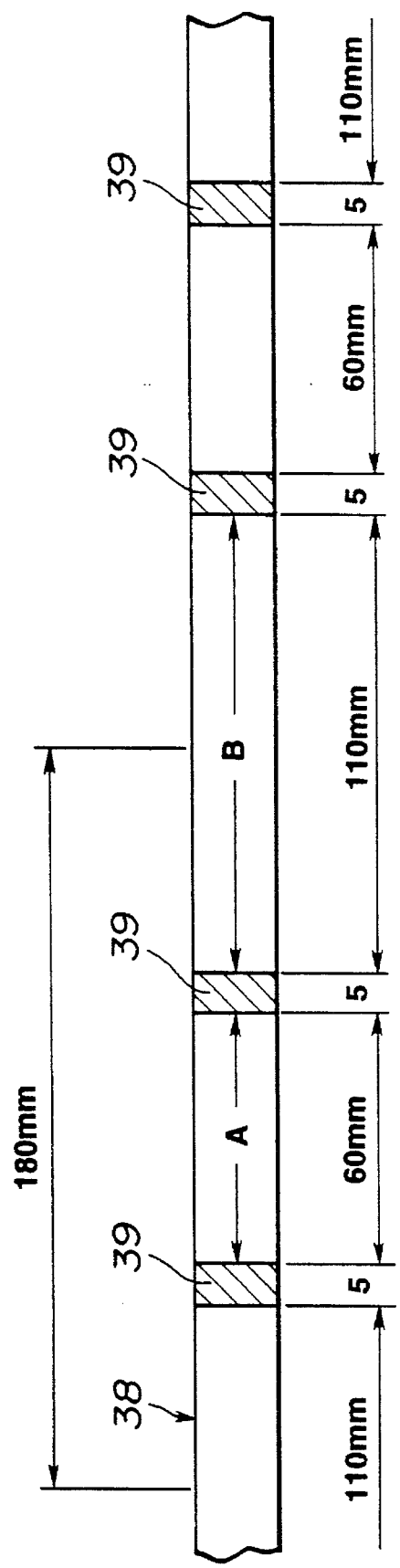
FIG. 6 is a front view showing an original tape or crude tape from which the tape leader employed in a tape cassette according to the present invention is produced.
Figure 7:
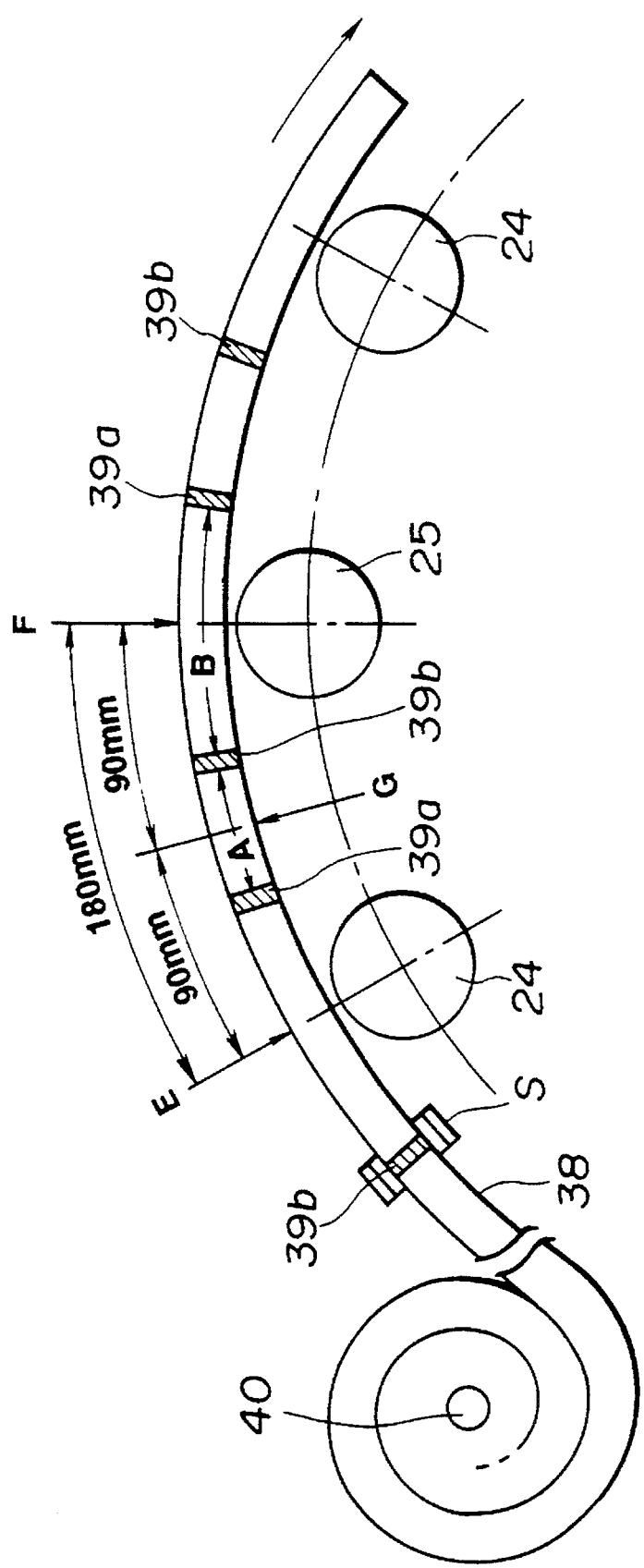
FIG. 7 is a schematic view showing an apparatus for producing a tape leader from the crude tape shown in FIG. 6.

Referring to FIGS. 6 and 7, the crude tape 38 is an elongated article bearing a plurality of pairs of opaque supply side information discriminating marks 39a and similarly opaque take-up side information discriminating marks 39b (generally as discriminating marks 39 in FIG. 6). The crude tape 88 is coiled around a roller 40 in the vicinity of which a circular table, not shown, having a tape travel path formed on its outer periphery, is arranged, as shown in FIG.

7. On the outer periphery of the circular table are arranged hubs 24 of the supply side tape reels 4 and hubs 25 of the take-up side tape reels 5 with a distance of e.g. 180 mm therebetween equal to twice the length of e.g. 90 mm required of the tape leader 28.

Cutting means, not shown, has three cutting points E, F and G in FIG. 7 for a pair of hubs 24, 25, for severing the crude tape 38 between the hubs 24, 25 so that cut lengths equal to 90 mm. A position sensor S consisting of a light-emitting device and a light-receiving device, facing each other with the tape travel path in-between, detects the information discriminating marks 39a, 39b.

In the above arrangement, an operator pulls out an end of the crude tape 38, coiled around the roller 40, along the tape travel path. The center of an intermediate area A between the information discriminating marks 39a, 39b is aligned with the central cutting point G, shown in FIG. 10, by way of performing an initial setting. After the end of the initial setting, the ends of the tape leaders 28 formed by cutting are clamped to the hubs 24, 25. Exchange to new hubs 24, 25, extraction of the crude tape 38 and positioning by counting of the information discrimination marks 39a, 39b by the position sensor S, are performed. This sequence of operations is repeated for simultaneously producing paired hubs 24, 25 provided with the tape leaders 28.

With the above arrangement, it is necessary to effect the initial setting so that the center of the intermediate area A between the information discriminating marks 39a, 39b is aligned with the central cutting point. However, since the crude tape 38 is formed by simply patterning pairs of the information discriminating marks 39a, 39b on the crude tape 38, it is likely that the intermediate area A between the information discriminating marks 39a, 39b be mistaken for an intermediate area B between neighboring information discrimination areas 39a and 39b. If such incorrect initial setting is made, since the subsequent position setting is performed by counting the information discriminating marks 39a, 39b by the position sensor S, the position setting in its entirety is in error.

It may be contemplated to reduce the length of the intermediate area A of the crude tape 38 drastically with respect to that of the area B to accentuate the difference in length between the areas A and B. However, if the length of the area A is reduced, the cutting error allowance is correspondingly reduced. Thus there is a risk that the width $L_1$ of the light-transmitting region 37 becomes shorter than a value allowed by the relevant standard due to the cutting error. Besides, it can not be determined whether the width $L_1$ of the light-transmitting region 37 of the tape leader 28 is within the range allowed by the relevant standard unless dimensional measurement for checking is performed. The production process in its entirety becomes complicated if a separate inspection process is required.

In this consideration, it is preferred that the tape leader 28 be constituted in the following manner. A crude tape 28 is an elongated strip of transparent polyethylene terephthalate (PET) having pairs of supply side information discriminating marks 39a and take-up side information discriminating marks 39b at a predetermined interval between adjacent sets of the information discriminating marks 39a, 3b, as shown in FIG. 3A. The intermediate area A between the information discriminating marks 39a, 39b less the areas which subsequently become the light-transmitting regions 37 is a cutting allowance area which is designed as a colored area 43. The colored area 43 may be formed easily when produced simultaneously with the information discriminating marks 39a, 39b.

The width $L_3$ of each light-transmitting region 37 needs to be 2 mm at least by the reason set forth above, while the width $L_4$ of the colored area 43 is selected in consideration of the cutting error of the crude tape coil 38 in the tape leader producing device. If, for example, the cutting error of the tape leader producing device is ±10 mm, the width $L_4$ of the colored area 43 is set to 20 mm. If the colored area 43 is low in light transmittance, similarly to the information discriminating marks 39a, 39b, the stop mode is selected based on detection not of the end of the magnetic tape 6 but of the end of the colored area 43. Therefore, the overall length L of the tape leader 28 is selected in consideration of the length $L_7$ from the end of the colored area 43 up to the connecting end to the tape reel (FIG. 9A) to prevent overrunning from being incurred during fast feed or rewind operations. In the embodiment illustrated, the width $L_3$ of the light-transmitting regions 37 is 2 mm, the width $L_4$ of the colored area 43 is 20 mm, the width $L_5$ of the information discriminating marks 39a, 39b is 15 mm, the length $L_6$ between the supply side information discriminating mark 39a and the take-up side information discriminating mark 39b neighboring thereto is 180 mm, with the overall length of the tape leader 28 being 107 mm.

The crude tape 38, prepared as described above, is wound on a roller 40 of the tape leader producing device as shown in FIG. 7. The operator then sets the center point of the intermediate area A between the information discriminating marks 39a, 39b into alignment with the central cutting point shown at G in FIG. 8B. Since the colored region 43 is provided at the intermediate area A between the information discriminating marks 39a, 39b, it suffices if the position setting is so made that the colored area 43 is aligned with the central cutting point, so that there is no risk of error in position setting.

Such error in position setting may be eliminated reliably by arranging an optical sensor having the central cutting point G in FIG. 8B as the point of detection, and by performing the cutting operation only if the colored area 43 has been detected by the optical sensor.

Figure 9A:
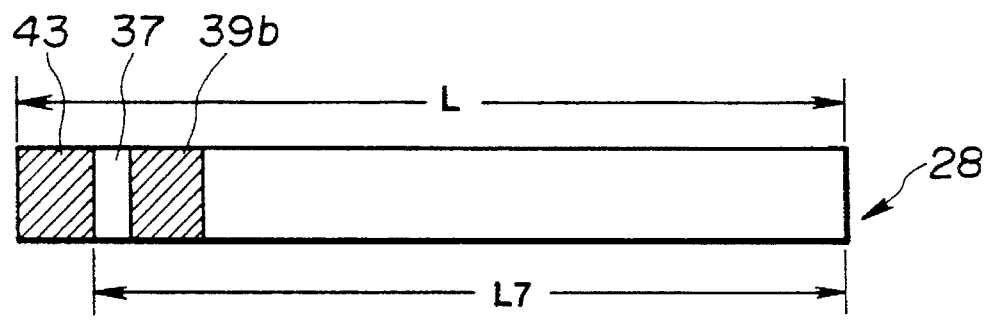
FIG. 9A is a front view showing a tape leader conforming to standard.
Figure 9B:
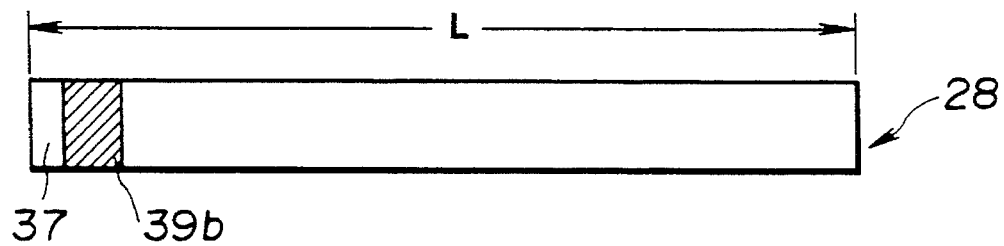
FIG. 9B is a front view showing a tape leader not conforming to standard.

If the cutting position is within the allowable range, the colored area 43 is left at the end of the tape leader 28 to be connected to the magnetic tape 6, as shown in FIG. 9A. If the cutting position is outside the allowable range, the colored area 43 is not left at the end of the tape leader 28 to be connected to the magnetic tape 6, such that only the light-transmitting regions 37 is left, as shown in FIG. 9B. This permits inspection of the tape leaders 28 as to possible rejects by checking only at the ends of the tape leaders.

Although only one of the information discriminating marks 39a or 39b is provided for each tape leader 28 in the above-described embodiment, it is also possible to provide two or more of the information discriminating marks 39a, 39b. If, for example, only one of the information discriminating marks 39a or 39b is employed, a tape is decided to be that for data if an output is lowered once for the information discriminating marks 39a or 39b, whereas, if two or more of the information discriminating marks 39a, 39b are employed, a tape is decided to be that for data if an output is lowered twice. In any case, since the information discriminating marks 39a, 39b are also provided on the take-up side tape leader 28 and on the supply side tape leader 28, a tape may instantly be decided to be that for data or that for video on loading the tape cassette on the recording/reproducing apparatus. Although the information discrimination mark 37 is provided in the above-described embodiment on the tape leader 28, a tape cassette for data or that for video may be discerned also instantly from each other when the discrimination mark is formed on the connection tape 29.

Figure 10:
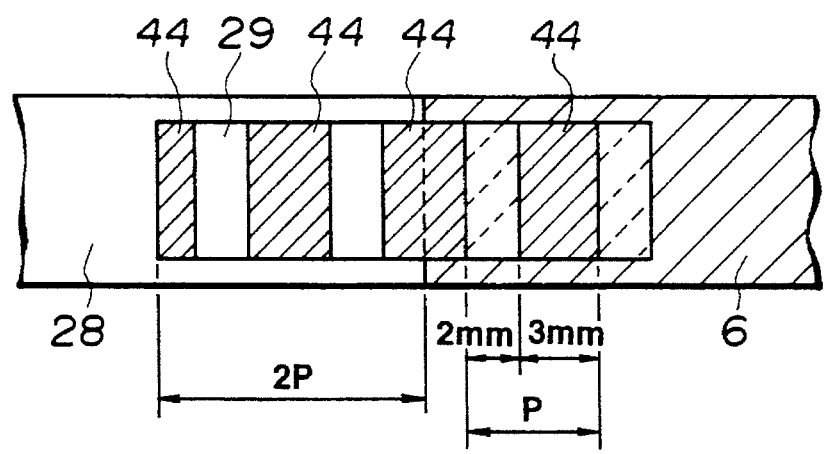
FIG. 10 is an enlarged schematic view showing a connection tape having an information discrimination mark formed thereon.

For example, a plurality of information discriminating marks 44 each 3 mm long are formed with an array of a plurality of transparent regions each 2 mm long in-between on, a connection tape 29 formed of a material capable of transmitting the light having a wavelength of 800 to 900 nm at a transmittance of not less than 60%, similarly to the tape leader 28 as shown in FIG. 10. The length of the information discriminating marks 44 is set to not less than 3 mm, with the interval therebetween being 2 mm, for the same reason as set forth in connection with the previous embodiment. The connection tape 29 is placed so that a length thereof at least equal to twice the pitch of the information discriminating marks 44, herein 5 mm, is located on the tape leader 28. Meanwhile, the transparent portions of the connection tape 29 between the information discriminating marks 44 are superposed on the magnetic tape 6 in those regions of the connection tape superposed on the magnetic tape 6. However, these transparent portions are supported by the magnetic tape 6, so that the transmittance of these superposed portions is not more than 60% without producing problems in outputs.

If the connecting tape 29 is placed so that the portion thereof at least twice as long as the pitch P of the information discriminating mark 44 is located on the tape leader 28, at least one information discriminating mark 44 is left on the tape leader 28 even when the remaining information discriminating mark 44 is positioned on the boundary line between the tape leader 28 and the magnetic tape 6. Thus a tape cassette may instantly be decided to be a tape cassette for data by detecting the information discriminating mark 44 by the light-receiving elements 18, 19.

The tape cassette for data and that for video may also be discerned visually or with a finger touch in the following manner.

Figure 11:
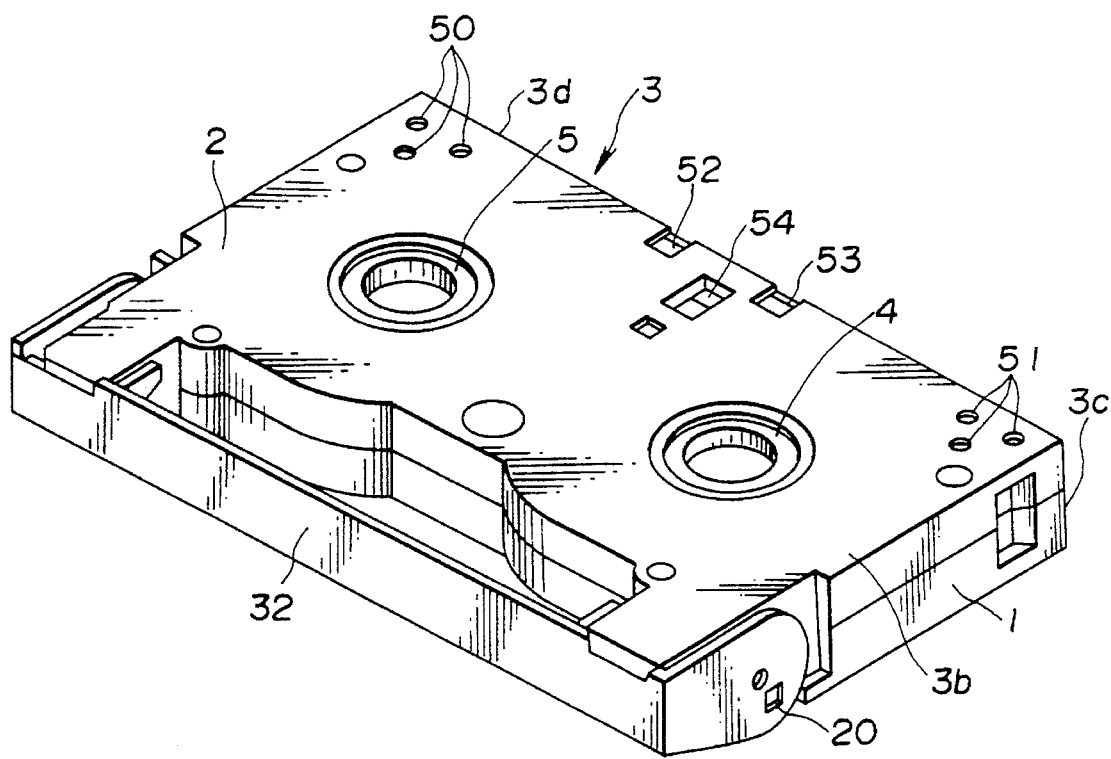
FIG. 11 is a perspective view of a tape cassette as viewed from its reverse side.

In FIG. 11, which is a perspective view as seen from the reverse side of the cassette main body, cassette positioning holes 11, 12 for positioning the tape cassette with respect to the recording/reproducing apparatus are formed so as to be engaged by cassette positioning pins provided on the recording/reproducing apparatus. These cassette positioning holes 11, 12 are formed as circular and elliptical openings on both side edges towards the tape extraction recess 10 in the cassette main body 3.

Tape length detection openings 50 for detecting the length of the magnetic tape 6 housed within the cassette main body 3 are formed in the bottom surface 3b of the cassette main body 3. These tape length detection openings 50 are formed as circular blind holes at a corner of the cassette main body 3. A plurality of tape type detection openings 51 are formed at the opposite side corner of the cassette main body 3. These detection openings 51 are also formed as small-sized circular openings.

In the present embodiment, information discrimination openings 52, 53 are formed only in the tape cassette housing the magnetic tape 6 for data for discriminating the tape cassette for data from that for video. These openings 52, 53 are formed on both sides of a reel lock release lever inserting opening 54, such as by partially segmenting the reverse surface 3c of the cassette main body 3 for preventing rotation of the tape reels 4 and 5.

That is, these information discrimination openings 52, 53 are formed on both sides of the reel lock release lever inserting opening 54 in the bottom surface 3b of the cassette main body 3 in the form of substantially rectangular-shaped square holes such as by partially segmenting the reverse surface 3c of the cassette main body 3. In other words, these information discrimination openings 52, 53 are formed as substantially rectangular-shaped square holes on both sides of the reel lock release lever inserting opening 54 such as by scraping off an edge portion 3d interconnecting the bottom surface 3b and the back surface 3c of the cassette main body 3. Meanwhile, with the existing tape cassettes, the regions on both sides of the reel lock release lever inserting opening 54 in which the information discrimination openings 52, 53 are provided are hollow and hence do not play any part in recording and/or playback operations.

Although there is no limitation as to the shape of the information discrimination openings 52, 53, these openings 52, 53 are preferably so shaped as to permit discrimination from the circular holes, such as the tape length detection openings 50 or detection openings 51. There is no limitation to the depth of the information discrimination openings 52, 53 if these openings are of such a depth as to be identified to be the information discrimination openings 52, 53 by detection by detection means provided on the recording/reproducing apparatus or by finger touch. However, it is necessary for the information discrimination openings 52, 53 to be not so deep as to affect the label area provided on the reverse surface 3c of the cassette main body 3. In the embodiment illustrated, the information discrimination openings 52, 53 are square-shaped and extended in depth up to the upper surface of the label area provided on the reverse surface 3c of the cassette main body 3.

By providing the information discrimination openings 52, 53 as by partially segmenting the reverse surface 3c of the cassette main body 3, the tape cassette may be readily discerned as being the tape cassette for data on visual inspection. Blind users may also be at a position to discern the tape cassette as being the tape cassette for data on touching the information discrimination openings 52, 53 provided at the edge 3d of the cassette main body 3. Besides, since the information discrimination openings 52, 53 are square-shaped in distinction from the circular detection holes 50, 51, the tape cassette may readily be identified to be that for data on checking the reverse side of the tape cassette.

Besides, the information discrimination openings 52, 53 are provided in the present embodiment on both sides of the reel lock release lever inserting opening 54, so that, if the cassette main body 3 is molded by injection molding, resin flow and hence moldability may be improved. In addition, by arranging the information discrimination openings 52, 53 on both sides of reel lock release lever inserting opening 54, distortion or twisting otherwise caused by contraction of the resin may be eliminated so that the bottom surface 3b of the cassette main body 3 functioning as the cassette reference plane may be improved in flatness. The information discrimination openings 52, 53 may also be used as a finger rest when loading the tape cassette.

What is claimed is:

1. A method for producing tape leaders for hubs from a crude tape bearing a plurality of pairs of information discriminating marks, each pair defining an intermediate area therebetween, comprising the steps of:

orienting said crude tape between two hubs such that said intermediate area is aligned with a central cutting point between said hubs;

cutting said crude tape at each of said two hubs and at said central cutting point and thereby creating a first tape leader between a first of said hubs and said central cutting point and a second tape leader between a second of said hubs and said central cutting point; and clamping a respective tape leader to each of said hubs.

2. A method as in claim 1, wherein said step of orienting said crude tape further comprises the step of:

sensing the position of said crude tape by optically detecting said information discriminating marks.

3. A method as in claim 1, wherein said intermediate area has light transmittance characteristics similar to those of said information discriminating marks and wherein said step of orienting said crude tape further comprises the step of optically detecting said intermediate area at the central cutting point.

* * * * *